(12) United States Patent
Harrington et al.

(10) Patent No.: US 6,987,744 B2
(45) Date of Patent: Jan. 17, 2006

(54) WIRELESS LOCAL AREA NETWORK WITH GEO-LOCATION CAPABILITY

(75) Inventors: Timothy C. Harrington, Los Gatos, CA (US); Robert W. Boyd, Rogersville, TN (US); Donald K. Belcher, Rogersville, TN (US); David Wisherd, Sunnyvale, CA (US)

(73) Assignee: Wherenet CORP, Santa Clara, CA (US)

( * ) Notice: Subject to any disclaimer, the term of this patent is extended or adjusted under 35 U.S.C. 154(b) by 828 days.

(21) Appl. No.: 09/997,282

(22) Filed: Nov. 29, 2001

(65) Prior Publication Data

US 2002/0118655 A1    Aug. 29, 2002

Related U.S. Application Data

(60) Provisional application No. 60/257,014, filed on Dec. 20, 2000, provisional application No. 60/250,720, filed on Dec. 1, 2000.

(51) Int. Cl.
*H04Q 7/216*    (2006.01)
*H04Q 7/24*    (2006.01)

(52) U.S. Cl. .................. 370/328; 370/338; 370/355; 342/450; 342/457

(58) Field of Classification Search ............. 370/235, 370/328, 252, 338, 386, 394, 416, 418; 342/51, 342/57, 450, 457, 451
See application file for complete search history.

(56) References Cited

U.S. PATENT DOCUMENTS

| 5,393,965 A | 2/1995 | Bravman et al. ........... 235/383 |
|---|---|---|
| 5,418,812 A | 5/1995 | Reyes et al. .................... 375/1 |
| 5,528,621 A | 6/1996 | Heiman et al. ............. 375/200 |
| 5,536,930 A | 7/1996 | Barkan et al. .............. 235/472 |
| 5,646,389 A | 7/1997 | Bravman et al. ........... 235/385 |
| 5,768,140 A | 6/1998 | Swartz et al. .......... 364/478.13 |
| 5,768,531 A | 6/1998 | Lin ....................... 395/200.72 |
| 5,802,101 A | 9/1998 | Maruyama ................... 375/206 |
| 5,812,589 A | 9/1998 | Sealander et al. .......... 375/200 |
| 5,850,187 A | 12/1998 | Carrender et al. ..... 340/825.54 |
| 5,920,287 A | 7/1999 | Belcher et al. ............. 342/450 |
| 5,923,702 A | 7/1999 | Brenner et al. ............. 375/202 |
| 5,995,046 A | 11/1999 | Belcher et al. ............. 342/450 |
| 6,031,863 A | 2/2000 | Jusa et al. ................... 375/202 |
| 6,121,926 A * | 9/2000 | Belcher et al. ............. 342/450 |
| 6,127,976 A | 10/2000 | Boyd et al. ................. 342/463 |
| 6,128,549 A | 10/2000 | Swartz et al. ............... 700/225 |
| 6,236,365 B1 * | 5/2001 | LeBlanc et al. ............ 342/457 |
| 6,268,723 B1 | 7/2001 | Hash et al. ................. 324/243 |

FOREIGN PATENT DOCUMENTS

EP    1 050 793 A2    11/2000
WO    99/37047    7/1999

* cited by examiner

*Primary Examiner*—Afsar Qureshi
(74) *Attorney, Agent, or Firm*—Allen, Dyer, Doppelt, Milbrath & Gilchrist, P.A.

(57) ABSTRACT

A system of the present invention is operative for locating a wireless mobile device in communication with a wireless local area network (WLAN) that includes a plurality of cells defining a wireless local area network each having an access point base station. The access point base stations communicate with wireless mobile devices using wireless communication signals as typically spread spectrum communication signals. A processor is operatively connected to each of the access point base stations and operative to process communication signals transmitted from a mobile device and determine which signals are first-to-arrive signals based on a common timing signal and conduct differentiation of the first-to-arrive signals to locate the mobile device.

36 Claims, 7 Drawing Sheets

WIRELESS LOCAL AREA NETWORK WITH GEO-LOCATION CAPABILITY

RELATED APPLICATION

This application is based upon prior filed copending provisional application Ser. No. 60/250,720 filed Dec. 1, 2000, and prior filed copending provisional application Ser. No. 60/257,014 filed Dec. 20, 2000.

FIELD OF THE INVENTION

This invention relates to the field of wireless local area networks (WLAN), and more particularly, this invention relates to a wireless local area network that provides mobile device location.

BACKGROUND OF THE INVENTION

Wireless local area networks are becoming more commonplace as the use of portable computers, such as "laptop," "notebook," and "pen" computers become increasingly common in office environments and other locations. In most conventional wireless local area networks, a number of access point base stations form a cellular network for communicating with wireless mobile stations or other mobile devices. Each access point base station is typically connected to a network server, such as part of an ethernet or other network infrastructure. Any messages transmitted as wireless communication signals are first transmitted to an access point base station instead of transmitted along wireless stations. This type of centralized wireless communication using cells provides control over communications along existing wireless mobile devices. Typically, the wireless communication signals are a spread spectrum communications signal, for example, a direct sequence spread spectrum signal, or a frequency hopping spread spectrum signal.

Although wireless local area networks are becoming more commonplace in offices and similar environments, most wireless local area networks do not provide the capability of determining the location of a wireless mobile device operating in the wireless LAN environment. Although some wireless LAN systems provide for signal strength analysis of spread spectrum signals to determine location, none of them provide an accurate means of determining the location of a mobile device operative within the wireless infrastructure defined by access point base stations.

SUMMARY OF THE INVENTION

The present invention advantageously provides a system for locating a wireless station in communication with a wireless local area network. The system typically includes a network server, such as an ethernet network server, that is operative with an ethernet local area network. A plurality of cells define a wireless local area network (WLAN), each having an access point base station and typically operatively connected to the server. Each access point base station communicates with wireless mobile devices using wireless communication signals, such as spread spectrum communication signals. A processor is operatively connected to each of the access point base stations and operative to process communication signals transmitted from a mobile device. The processor determines which signals are first-to-arrive signals based on a common timing signal and conducts differentiation of the first-to-arrive signals to locate a mobile device.

In one aspect of the present invention, the common timing signal comprises a wireless timing signal broadcast to each of the access point base stations. This wireless timing signal could also be broadcast from a mobile device located at a known location or from an access point base station. A common bus could be operatively connected to each of the access point base stations to which a common timing signal is provided. The common bus could be part of the LAN infrastructure connected to the network server, such as an ethernet local area network.

The wireless communication signal transmitted from the mobile devices could include a location pulse appended to the wireless communication signal. The location pulse could be appended to one of the rising edge or falling edge of the wireless communication signal transmitted from a mobile device. This location pulse is typically a spread spectrum signal of short duration, i.e., a pulse.

In yet another aspect of the present invention, each base station could include edge detection circuitry for detecting the leading edge of a communication signal transmitted from a mobile device. This detected leading edge is processed and the first-to-arrive signals are determined based on a common timing signal. A processor conducts differentiation of the first-to-arrive signals to locate the mobile device.

In yet another aspect of the present invention, a correlator is time referenced with the common timing signal and operative with each of the access point base stations and receives a portion of a wideband spread spectrum communication signal received from a mobile device to determine first-to-arrive signals and conduct differentiation of first-to-arrive signals to locate the mobile device. This correlator could include a spread spectrum matched filter and associated processing circuitry.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously provides a system for locating a wireless mobile device, or mobile station (MS) as hereinafter referred, operating in communication with a wireless local area network (WLAN). Much of the technology and detection capability as associated with the system and method of the present invention can use the circuitry and algorithms described in commonly assigned U.S. Pat. Nos. 5,920,287; 5,995,046; 6,121,926; and 6,127,976, the disclosures which are hereby incorporated by reference in their entirety.

Figure 1:
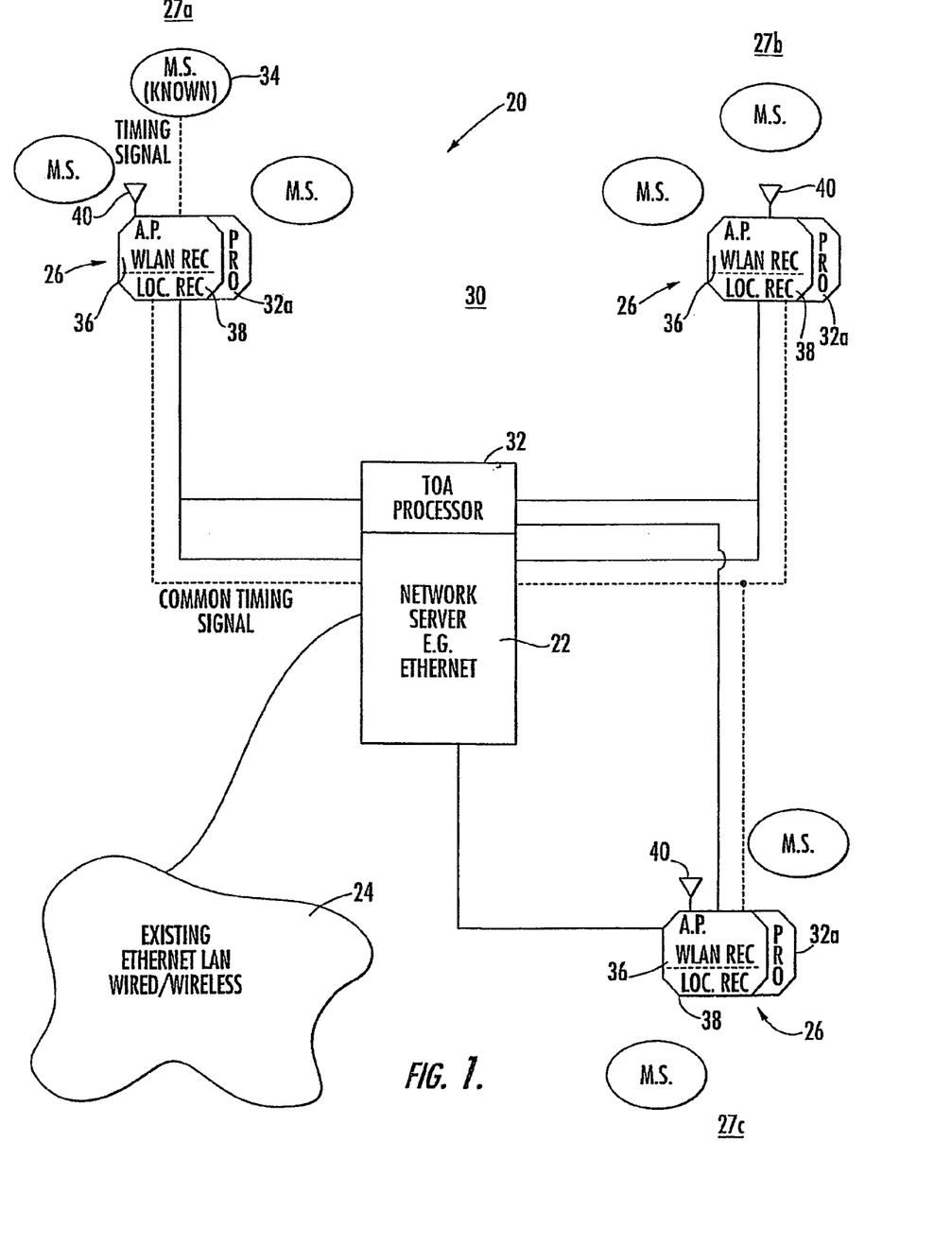
FIG. 1 is an overall system diagram of the location determination system of the present invention.

FIG. 1 illustrates a high level block diagram of the system 20 of the present invention and showing a network server 22 that is part of an ethernet local area network 24. A plurality of access point base stations 26 each define a cell (shown as 27a, 26b, 27c) as part of a wireless local area network 30 that communicates with wireless mobile stations (MS) using wireless communication signals that, in a preferred embodiment, are spread spectrum wireless communication signals. A processor 32 is operatively connected to each of the access point base stations and operative to process communication signals transmitted from a mobile station and determine which signals are first-to-arrive signals based on a common timing signal. The processor conducts differentiation of the first-to-arrive signals to locate the mobile station. The processor function could also be incorporated with each access point base station by incorporating a processor 32a at each access point base station 26. A common timing signal can be applied to each access point base station (and to processor 32 and 32a) and could be provided by a wireless timing signal broadcast to each of the access point base stations, such as by a mobile station (MS) located at a known location 34 or an access point base station that provides the common timing signal. In yet another aspect of the present invention, a common timing signal can be supplied through a common bus, such as part of the ethernet structure.

Figure 2:
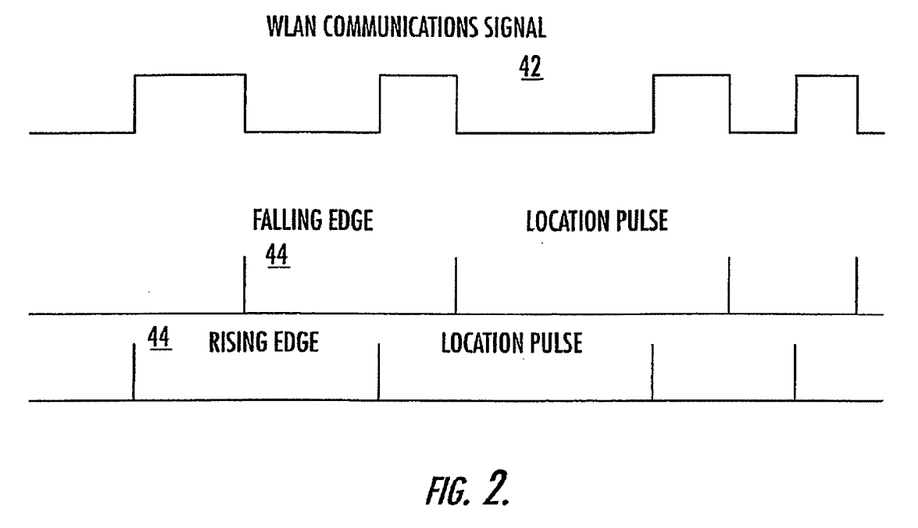
FIG. 2 is a graph showing the appending of a location pulse to a wireless communication signal.
Figure 3:
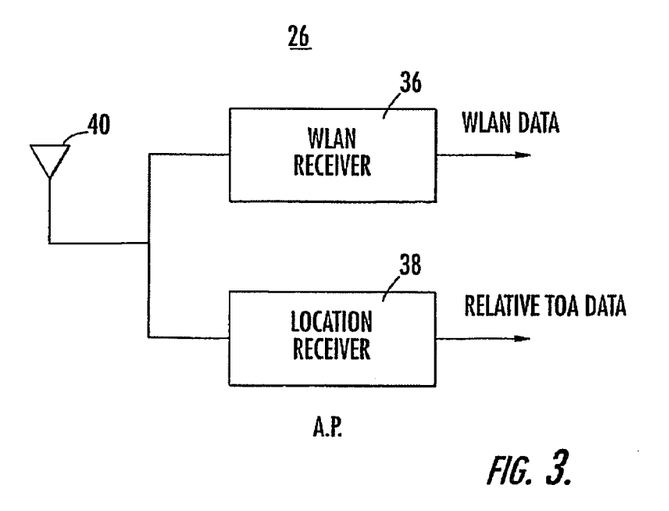
FIG. 3 is a block diagram showing an access point base station having a wireless local area network (WLAN) receiver that receives a wireless communications signal and location receiver that receives a location pulse.

FIG. 3 illustrates one type of access point base station 26 having a wireless local area network (WLAN) receiver 36 for receiving communications signals and a location receiver 38, operatively connected to the processor 32,32a for determining which signals are first-to-arrive signals and conducting differentiation of the first-to-arrive signals to locate the mobile station. The receivers 36,38 can operate from the same antenna 40. As shown in FIG. 2, a wireless local area network communications signal 42 is transmitted from a mobile station (MS) and includes a spread spectrum location pulse 44 appended to the wireless communication signal. This location pulse 44 is a short duration (typically less than one millisecond) spread spectrum transmission as a location pulse that is distinct and different from the wireless local area network communications signal. As shown in FIG. 2, the location pulse 44 can be appended to the falling edge of the wireless communications signal or appended to the beginning or rising edge of the communications signal.

Figure 4A:
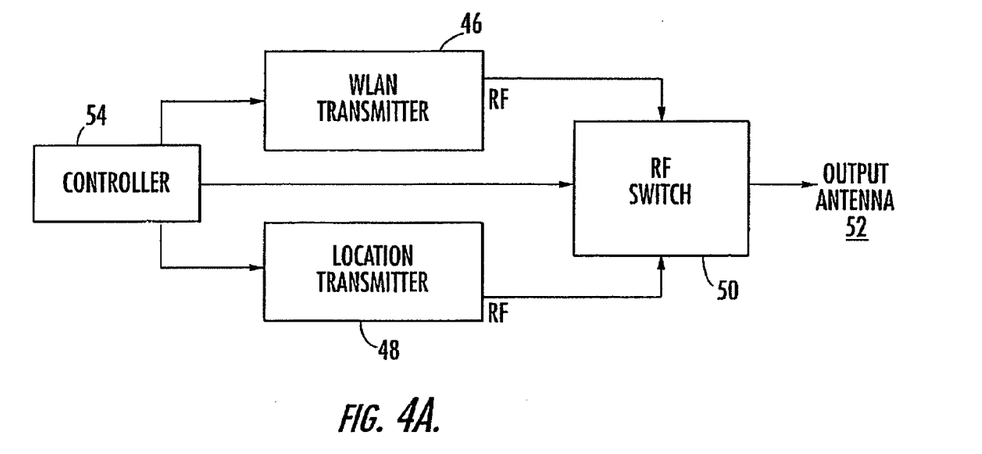
FIGS. 4A and 4B are block diagrams showing a mobile device having a wireless local area network (WLAN) transmitter for transmitting a wireless communications signal and location transmitter that transmits a location pulse that will be appended to the wireless communications signal through a radio frequency switch, and use of a signal detect circuit (FIG. 4B).
Figure 4B:
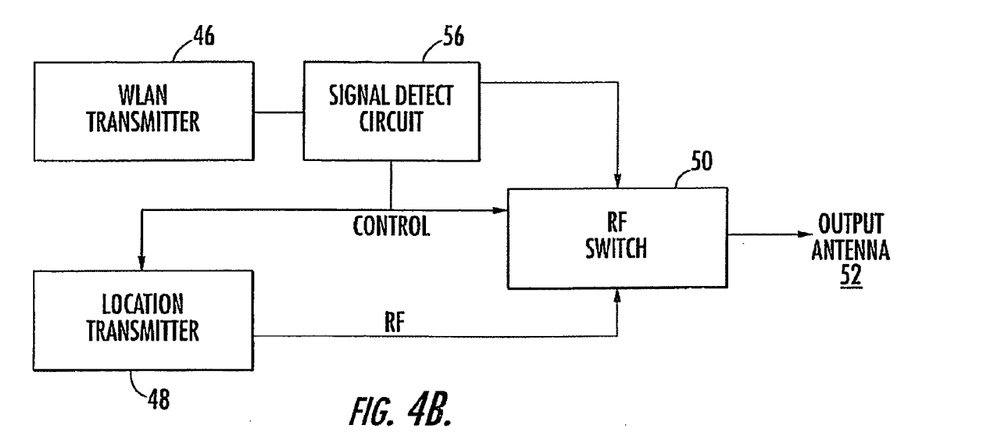

As shown in FIG. 4A, each mobile station (MS) preferably includes a wireless local area network (WLAN) transmitter 46 for transmitting a communications signal, such as a spread spectrum communications signal, having appropriate data that is part of the mobile station transmission, including verification data and message data. A location transmitter 48 for generating the location pulse 44 can be part of the mobile station (MS) and connect to a radio frequency (RF) switch 50 that forwards the communications signal 42 and pulse 44 to an antenna 52. A controller 54 can be operatively connected to the wireless local area network transmitter 46 and location transmitter 48 to operate the radio frequency switch 50 for determining proper transmission and appending of location pulse onto the communications signal, using synchronizing techniques known to those skilled in the art. It is also possible that a signal detect circuit 56 (FIG. 4B) can be connected to the location transmitter 48 and wireless local area network transmitter 46 for detecting a transmission from the wireless local area network transmitter and operatively signal the radio frequency switch 50 and location transmitter 48 for proper operation. Various synchronizing concepts can be applied.

The type of location pulse 44 that is transmitted by the location transmitter 48 can vary, but typically comprises a direct sequence spread spectrum pulse, although a frequency hopping, chirp or other spread spectrum signal can also used. The pulse is a short duration wideband spread spectrum pulse of RF energy that can be about 100 millisecond duration. A repetition rate could vary with applications from tens of seconds to several hours, more or less as desired by those skilled in the art. Further details of the type of pulse are set forth in the incorporated by reference patents.

For purposes of description, the type of location circuits, algorithm, and associated functions that can be used with the present invention, such as the processor functions and location receiver and location transmitter, are set forth in the incorporated by reference patents. For purposes of description, FIGS. 7 and 8 describe representative examples of circuit architectures that can be used for the location receiver and processor.

Figure 7:
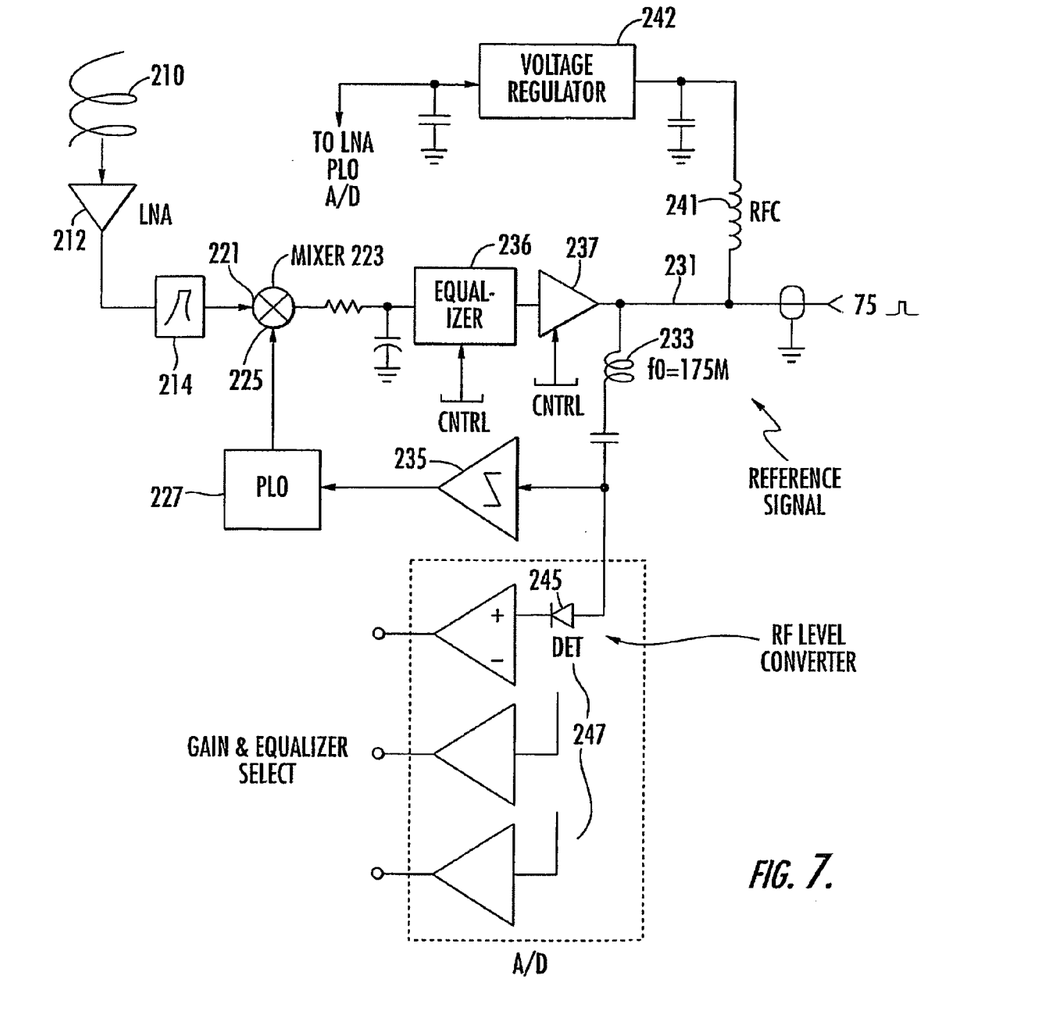
FIG. 7 is a high level block diagram of one example of the circuit architecture that can be used for a location receiver.

FIG. 7 diagrammatically illustrates one type of circuitry configuration of a respective location receiver (or "reader") architecture for "reading" location pulses or associated signals, "blink" as sometimes referred, such as emitted from a mobile station. An antenna 210 senses appended transmission bursts or other signals from a respective mobile station. The antenna, which is preferably omnidirectional and circularly polarized, is coupled to a power amplifier 212, whose output is filtered by a bandpass filter 214. Respective I and Q channels of the bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and applied to communication cable 231 to a communication signal processor, which could be associated processor 32,32$a$. The communication cable 231 also supplies DC power for the various components of the location receiver by way of an RF choke 241 to a voltage regulator 242, which supplies the requisite DC voltage for powering an oscillator, power amplifier and analog-to-digital units of the receiver.

The amplitude of the (175 MHZ) reference frequency supplied by the communications control processor to the phase locked local oscillator 227 implies the length of any communication cable 231 between the processor and the receiver. This magnitude information can be used as control inputs to equalizer 236 and current amplifier 237, so as to set gain and/or a desired value of equalization, that may be required to accommodate any length of a communication cable. For this purpose, the magnitude of the reference frequency may be detected by a simple diode detector 245 and applied to respective inputs of a set of gain and equalization comparators shown at 247. The outputs of comparators are quantized to set the gain and/or equalization parameters.

Figure 8:
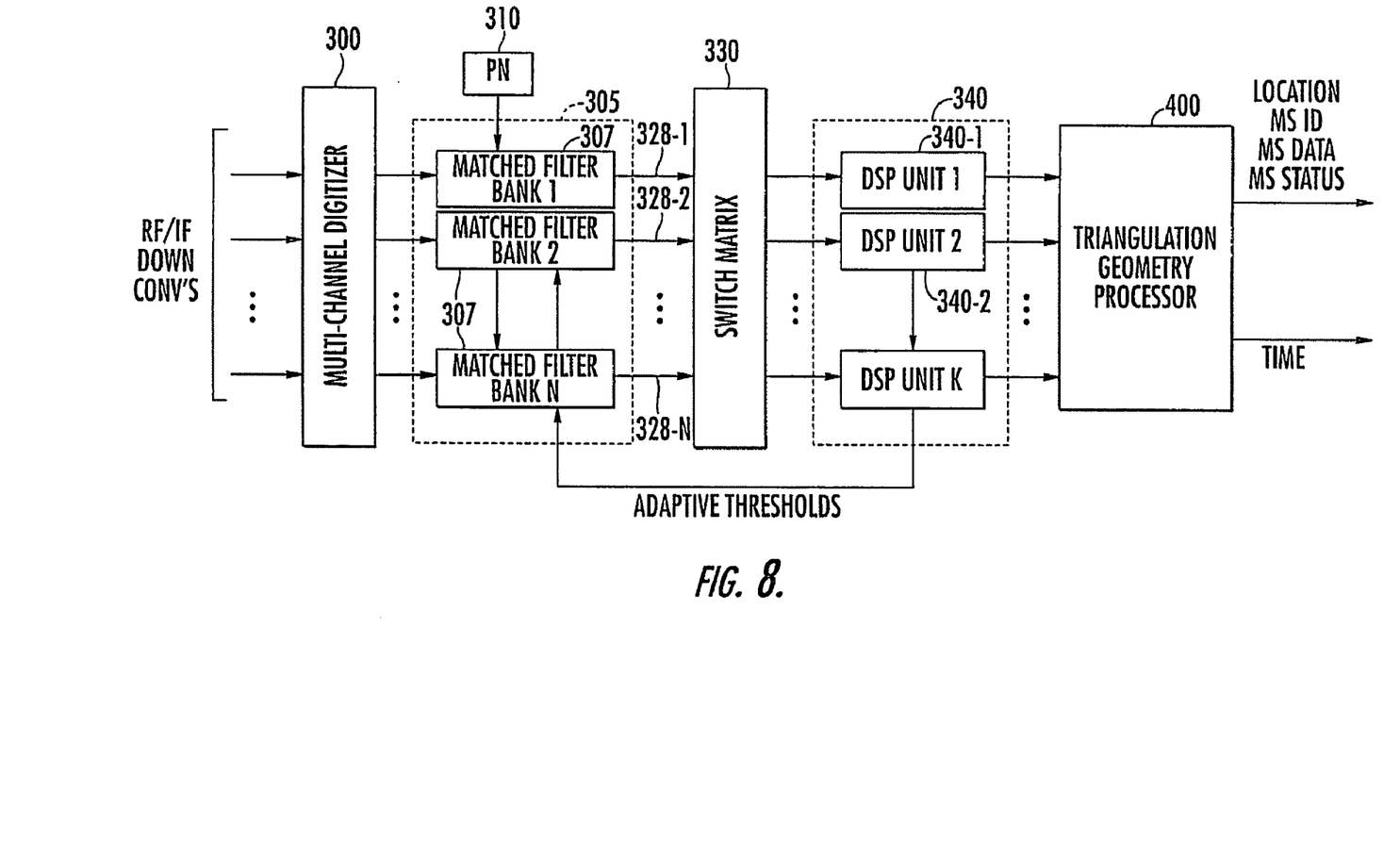
FIG. 8 is another high level block diagram of one example of the circuit architecture that can be used for a correlation-based, RF signal processor in accordance with the present invention.

FIG. 8 diagrammatically illustrates the architecture of a correlation-based, RF signal processor as part of processor 32 and/or 32$a$ to which the output of a respective RF/IF conversion circuit of FIG. 7 can be coupled for processing the output and determining location. The correlation-based RF signal processor correlates spread spectrum signals detected by its associated receiver with successively delayed or offset in time (by a fraction of a chip) spread spectrum reference signal patterns, and determines which spread spectrum signal received by the receiver is the first-to-arrive corresponding to a "blink" or location pulse from the location transmitter as part of the communications signal that has traveled over the closest observable path between the mobile station and the location receiver.

Because each receiver can be expected to receive multiple signals from the mobile station, due to multipath effects caused by the signal transmitted by the mobile station being reflected off various objects/surfaces between the mobile station and the receiver, the correlation scheme ensures identification of the first observable transmission, which is the only signal containing valid timing information from which a true determination can be made of the distance from the tag to the receiver.

For this purpose, as shown in FIG. 8, the RF processor employs a front end, multi-channel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive ADCs that are capable of directly sampling very high IF frequencies and large bandwidths. Implementing a bandpass filtering approach typically requires a second ASIC to provide an interface between the ADCs and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by the PN spreading sequence generator of the location transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of 'on-demand' or 'as needed' digital processing units 340-1, 340-2, . . . , 340-K. One of the correlator outputs 328 has a summation value exceeding the threshold, which delayed version of the PN spreading sequence is effectively aligned (to within half a chip time) with the incoming signal.

This signal is applied to a switching matrix 330, which is operative to couple a 'snapshot' of the data on the selected channel to a selected digital signal processing unit 340-$i$ of the set of digital signal processing units 340. The mobile station can 'blink' or transmit location pulses randomly, and can be statistically quantified, and thus, the number of potential simultaneous signals over a processor revisit time could determine the number of such 'on-demand' digital signal processors required. A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

Processor section 400 uses a standard multi-lateration algorithm that relies upon time-of-arrival inputs from at least three detectors to compute the location of the object. The algorithm may be one which uses a weighted average of the received signals. In addition to using the first observable signals to determine object location, the processor also can read any data read out of a mobile station's memory and superimposed on the transmission. Object position and parameter data can be downloaded to a data base where object information is maintained. Any data stored in a mobile station memory may be augmented by altimetry data supplied from a relatively inexpensive, commercially available altimeter circuit. Further details of such circuit are found in the incorporated by reference '926 patent.

It is also possible to use an enhanced circuit as shown in the incorporated by reference '926 patent to reduce multipath effects, by using dual antenna and providing spatial diversity-based mitigation of multipath signals. In such systems, the antennas of each location receiver at a base station are spaced apart from one another by a distance that is sufficient to minimize destructive multipath interference at both antennas simultaneously, and also ensure that the antennas are close enough to one another so as to not significantly affect the calculation of the location of the object by the downstream multi-lateration processor.

The multi-lateration algorithm executed by the processor is modified to include a front end subroutine that selects the earlier-to-arrive outputs of each of the detector pairs as the value to be employed in the multi-lateration algorithm. A plurality of auxiliary 'phased array' signal processing paths can be coupled to the antenna set (e.g., pair), in addition to the paths containing the directly connected receivers and their associated first arrival detector units that feed the triangulation processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively 'early' signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the 'pattern' or spatial distribution of gain to receive one incoming signal and ignore the other.

The multi-lateration algorithm executed by the processor could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference U.S. Pat. No. 6,127,976 . This architecture can be configured to distribute the workload over a plurality of interconnected information handling and processing subsystems. Distributing the processing load enables fault tolerance through dynamic reallocation.

The front end processing subsystem can be partitioned into a plurality of detection processors, so that data processing operations are distributed among sets of detection processors. The partitioned detection processors are coupled in turn through distributed association processors to multiple location processors. For maximum mobile station detection capability, each receiver is preferably equipped with a low cost omnidirectional antenna, that provides hemispherical coverage within the monitored environment.

A detection processor filters received energy to determine the earliest time-of-arrival energy received for a transmission, and thereby minimize multi-path effects on the eventually determined location of a mobile device. The detection processor demodulates and time stamps all received energy that is correlated to known spreading codes of the transmission, so as to associate a received locatoin pulse with only one mobile station. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor.

The flow control mechanism uses an information and processing load distribution algorithm, to determine which of the association processors is to receive the message, and queues the message on a prescribed protocol coupling socket connecting the detection processor to the destination association processor. To select a destination association processor, the information and processing load distribution algorithm may include a prime number-based hashing operation to ensure a very uniform distribution of packets among association processors. In addition, to provide relatively even partitioning in the case of widely varying transmission rates, the hashing algorithm may use a sequence number contained in each transmission.

Each association processor can organize its received message packets by identification (ID) and time-of-arrival (TOA), and stores them as association reports. The association processor compresses the data within the association report, transmits that information over an association communication process of the communication framework to one of a plurality of distributed location processors, and then de-allocates the association report.

In order to deliver all association reports that have been generated for an individual mobile station (or device) to a single destination location processor, the association communication process of the communication framework may employ the same information and processing load distribution algorithm executed by the detection communication process of the communication framework. Each location processor determines the geographical location of a mobile station using the time-of-arrival measurement information originally sourced from the detection processors. The specific algorithm employed for location determination matches the number of arrival time measurements with whatever a priori information is available.

To locate a mobile station, a location processor may employ all available diversity information associated with the mobile station of interest, including, but not limited to the mobile station ID, any data contained in the transmission and metrics indicating confidence it these values. It then forwards a location report containing this information over a location communication process to an asset management data base. A location estimate may be derived from the measured time-of-arrival information in a received association report packet, using a differential time-of-arrival algorithm, such as a hyperbolic geometry-based function.

Figure 5A:
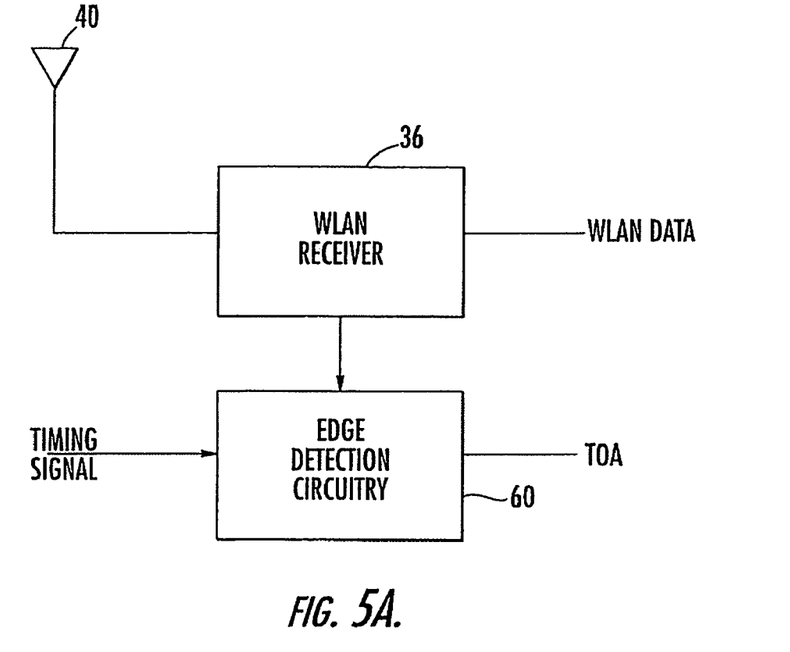
FIGS. 5A and 5B are block diagrams showing an access point base station having an edge detector circuit.
Figure 5B:
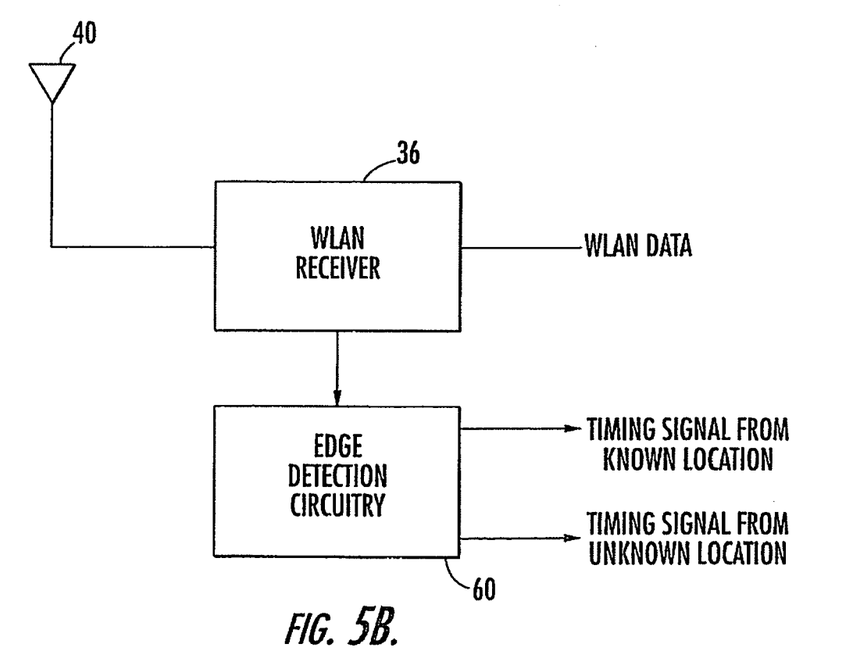

It is also possible to use a wireless local area network (WLAN) spread spectrum waveform to perform the geolocation function of the present invention. The assumption is that the wireless communication signal, as a spread spectrum signal, has a high signal-to-noise ratio with reasonable power levels. The leading edge of this communication signal can be detected to a high accuracy and this information used with the algorithms as described before to provide relative time of arrival information for subsequent processing. FIG. 5A shows edge detector circuitry 60 as part of an access point base station 26 having the wireless local area network (WLAN) receiver 36. It is also possible to have a timing signal from a known location or unknown location as shown in FIG. 5B. Other component locations would have to be known, of course. For example, some wireless local area network (WLAN) transmitters have known locations to enable the use of the algorithm when an access point base station or mobile station location is known.

Figure 6:
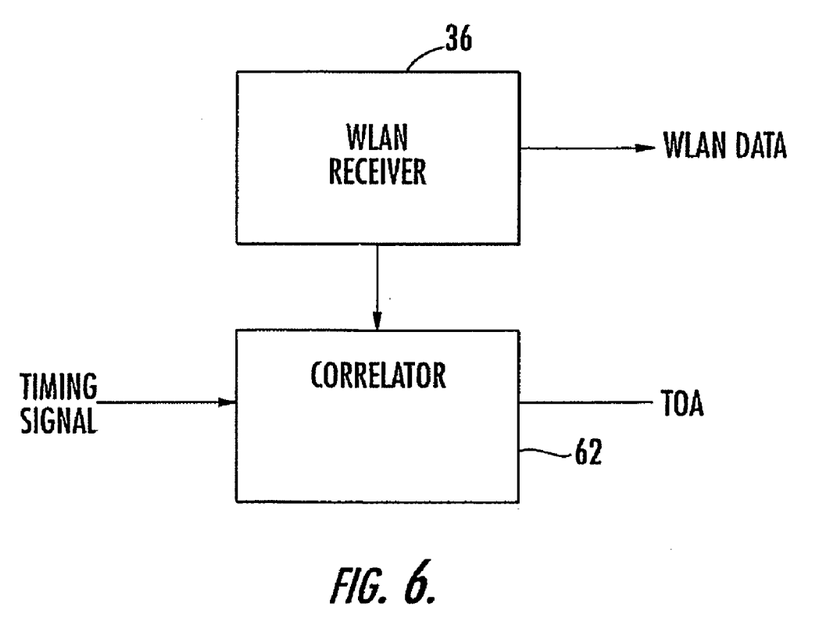
FIG. 6 illustrates another block diagram of an access point base station with an operatively connected correlator that could be a spread spectrum matched filter for wideband spread spectrum communications signals.

It is also known that the communications signal as a spread spectrum communications signal can have sufficient bandwidth to provide useful time accuracy. For example, a 50 MHz bandwidth could provide approximately 5 nanoseconds of timing accuracy that is about 5 feet of accuracy using much of the technology and teachings described before. It is possible to use a correlator 62 operative as a functional spread spectrum matched filter to enable a higher quality estimate with integration over many chips of the spread spectrum transmission (FIG. 6). It is possible to use a matched filter that spans multiple symbols and improve accuracy by collecting more energy in the filter prior to leading edge detection.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

What is claimed is:

1. A system for locating a wireless station in communication with a wireless local area network comprising:

a plurality of cells defining a wireless local area network (WLAN) and each having an access point base station and adapted for communicating with wireless mobile devices using wireless communications signals; and a processor operatively connected to each of said access point base stations and operative to process communications signals transmitted from a mobile device and determining which signals are first-to-arrive signals based on a common timing signal and conducting differentiation of the first-to-arrive signals to locate the mobile device.

2. A system according to claim 1, wherein said common timing signal comprises a wireless timing signal broadcast to each of said access point base stations.

3. A system according to claim 2, wherein a mobile station located at a known location is operative for generating the common timing signal.

4. A system according to claim 2, wherein an access point base station is operative for generating the common timing signal.

5. A system according to claim 1, and further comprising a common bus operatively connected to each of said access point base stations through which a common timing signal is provided to each access point base station.

6. A system according to claim 1, wherein any communications signals transmitted from mobile devices further comprise a location pulse appended to the wireless communications signal.

7. A system according to claim 6, wherein said location pulse is appended to a rising edge of the wireless communications signal transmitted from the mobile device.

8. A system according to claim 6, wherein said location pulse is appended to the falling edge of the wireless communications signal transmitted from the mobile device.

9. A system according to claim 1, and further comprising a network interconnecting each of said access point base stations and a server.

10. A system according to claim 9, wherein said network comprises an ethernet local area network.

11. A system according to claim 1, wherein said wireless communications signals comprise spread spectrum communications signals.

12. A system for locating a wireless station in communication with a wireless local area network comprising:

a plurality of cells defining a wireless local area network (WLAN) and each having an access point base station and adapted for communicating with wireless mobile devices using wireless spread spectrum communications signals, each base station further comprising edge detection circuitry time for detecting the leading edge of a communications signal transmitted from a mobile device; and a processor operatively connected to each of said access point base stations and operative to process the detected leading edge of received communications signals and determining first-to-arrive signals based on a common timing signal and conducting differentiation of the first-to-arrive signals to locate the mobile station.

13. A system according to claim 12, wherein said common timing signal comprises a wireless timing signal broadcast to the edge detection circuitry of each of said access point base stations.

14. A system according to claim 12, wherein a mobile device located at a known location is operative for generating the common timing signal.

15. A system according to claim 12, wherein an access point base station at a known location is operative for generating the common timing signal.

16. A system according to claim 12, and further comprising a common bus operatively connected to each of said access point base stations and edge detection circuitry through which a common timing signal is provided.

17. A system according to claim 12, and further comprising a network interconnecting each of said access point base stations and a server.

18. A system according to claim 17, wherein said network comprises an ethernet local area network.

19. A system for locating a wireless station in communication with a wireless local area network comprising:

a plurality of cells defining a wireless local area network (WLAN) and each having an access point base station and adapted for communicating with wireless mobile devices contained within a cell using wideband spread spectrum communications signals; and a correlator operative with each of said access point base stations and time referenced with a common timing signal for receiving a portion of a wideband spread spectrum communications signal received from a mobile device for determining first-to-arrive signals and conducting differentiation of the first-to-arrive signals to locate the mobile device.

20. A system according to claim 19, wherein said correlator comprises a spread spectrum matched filter.

21. A system according to claim 19, wherein said common timing signal comprises a wireless timing signal broadcast to each of said access point base stations.

22. A system according to claim 19, wherein a mobile station located at a known location is operative for generating the common timing signal.

23. A system according to claim 19, wherein an access point base station at a known location is operative for generating the common timing signal.

24. A system according to claim 19, and further comprising a common bus operatively connected to each of said access point base stations through which a common timing signal is provided.

25. A system according to claim 19, and further comprising a network interconnecting each of said access point base stations and said server.

26. A system according to claim 25, wherein said network comprises an ethernet local area network.

27. A system for locating a wireless station in communication with a wireless local area network comprising:
- a plurality of cells defining a wireless local area network (WLAN) and each having an access point base station time;
- at least one wireless mobile station for communicating with said access point base stations and each comprising a wireless local area network (WLAN) transmitter for transmitting a wireless communication signal to base stations and a location transmitter for appending a spread spectrum location pulse onto one of a rising or falling edge of the wireless communication signal; and
- a processor operatively connected to each of said access point base stations and operative to receive and process the appended location pulse from a mobile station and determining which signals are first-to-arrive signals based on a common timing signal and conducting differentiation of the first-to-arrive signals to locate the mobile station.

28. A system according to claim 27, and further comprising a radio frequency (RF) switch operatively connected to said WLAN transmitter and said location transmitter for allowing transmission through a common antenna.

29. A system according to claim 28, and further comprising a signal detect circuit operatively connected to said WLAN transmitter and said location transmitter for triggering said location transmitter and said RF switch.

30. A system according to claim 27, wherein each base station further comprises a location receiver for receiving the location pulse.

31. A system according to claim 27, wherein said common timing signal comprises a wireless timing signal broadcast to each of said access point base stations.

32. A system according to claim 27, wherein a mobile station located at a known location is operative for generating the common timing signal.

33. A system according to claim 27, wherein an access point base station at a known location is operative for generating the common timing signal.

34. A system according to claim 27, and further comprising a common bus operatively connected to each of said access point base stations through which a common timing signal is provided.

35. A system according to claim 27, and further comprising a network interconnecting each of said access point base stations and said server.

36. A system according to claim 35, wherein said network comprises an ethernet local area network.

* * * * *

UNITED STATES PATENT AND TRADEMARK OFFICE
CERTIFICATE OF CORRECTION

PATENT NO. : 6,987,744 B2
APPLICATION NO. : 09/997282
DATED : January 17, 2006
INVENTOR(S) : Harrington et al.

It is certified that error appears in the above-identified patent and that said Letters Patent is hereby corrected as shown below:

| | |
|---|---|
| Column 5, Line 1 | Delete: "processor"<br>Insert: --with processor-- |
| Column 6, Line 6 | Delete: "by PN"<br>Insert: "by the PN" |
| Column 6, Line 24 | Delete: "which delayed"<br>Insert: --which the delayed-- |
| Column 7, Line 59 | Delete: "locatoin"<br>Insert: --location-- |
| Column 8, Line 43 | Delete: "confidence it"<br>Insert: --confidence in-- |

Signed and Sealed this

Eighth Day of August, 2006

JON W. DUDAS
*Director of the United States Patent and Trademark Office*